US011622080B2

(12) United States Patent
Peng et al.

(10) Patent No.: US 11,622,080 B2
(45) Date of Patent: Apr. 4, 2023

(54) AUTOMATIC SURROUND PHOTOGRAPHING METHOD AND SYSTEM FOR TARGET

(71) Applicant: REMO TECH Co., Ltd., Guangdong (CN)

(72) Inventors: Yu Peng, Guangdong (CN); Ming Zhang, Guangdong (CN); Long Huang, Guangdong (CN)

(73) Assignee: REMO TECH Co., Ltd., Shenzhen (CN)

( * ) Notice: Subject to any disclaimer, the term of this patent is extended or adjusted under 35 U.S.C. 154(b) by 10 days.

(21) Appl. No.: 17/499,862

(22) Filed: Oct. 13, 2021

(65) Prior Publication Data

US 2022/0038632 A1 Feb. 3, 2022

Related U.S. Application Data

(63) Continuation of application No. PCT/CN2019/101267, filed on Aug. 19, 2019.

(30) Foreign Application Priority Data

Aug. 2, 2019 (CN) .......................... 201910713126.6

(51) Int. Cl.
*H04N 5/232* (2006.01)
*G03B 17/56* (2021.01)
*G05D 1/00* (2006.01)

(52) U.S. Cl.
CPC ....... *H04N 5/23299* (2018.08); *G03B 17/561* (2013.01); *G05D 1/0094* (2013.01)

(58) Field of Classification Search
CPC .... H04N 5/332; H04N 5/23299; H04N 7/185; F16M 11/123; G03B 17/561;
(Continued)

(56) References Cited

U.S. PATENT DOCUMENTS 5,204,573 A * 4/1993 Bederson ............. H02K 41/031
310/91
9,305,217 B2 * 4/2016 Lee ........................ G06V 20/10
(Continued)

FOREIGN PATENT DOCUMENTS

| CN | 105425806 A | 3/2016 |
|----|-------------|--------|
| CN | 106970641 A | 7/2017 |

OTHER PUBLICATIONS

International Search Report of PCT Patent Application No. PCT/CN2019/101267 dated Apr. 24, 2020.

*Primary Examiner* — Pritham D Prabhakher (57) ABSTRACT

Disclosed are an automatic surround photographing method and system for a target. The method includes: obtaining an angle parameter of a yaw-axis gimbal, and processing an image obtained by a camera to obtain a distance parameter; obtaining, by means of calculation, a control parameter of a rotation angle of a steering gear according to the angle parameter of the yaw-axis gimbal and the distance parameter; and controlling, according to the angle parameter of the yaw-axis gimbal, the rotation of a gimbal of a gimbal camera so as to control the rotation of the camera, and controlling, according to the control parameter of the rotation angle of the steering gear, a rotation angle of the steering gear in a photographing-moving apparatus for placement of the gimbal camera, such that the photographing-moving apparatus surrounds and tracks a target, and performs surround photographing of the target.

6 Claims, 4 Drawing Sheets

(58) Field of Classification Search
CPC ........ G01C 11/02; G05B 6/02; G05D 1/0094; G05D 2201/02; G01S 3/7864
USPC .................................................... 348/207.99
See application file for complete search history.

(56) References Cited

U.S. PATENT DOCUMENTS

| | | | |
|---|---|---|---|
| 2013/0155226 A1* | 6/2013 | Lee .................... | G06T 7/215 |
| | | | 901/1 |
| 2014/0270744 A1* | 9/2014 | Webb ................ | H04N 5/23267 |
| | | | 396/55 |
| 2015/0229906 A1* | 8/2015 | Inacio De Matos .. | G01S 3/7864 |
| | | | 348/46 |
| 2016/0301845 A1* | 10/2016 | Bell .................... | H04N 5/2328 |
| 2017/0227162 A1* | 8/2017 | Saika .................. | F16M 11/121 |
| 2018/0106422 A1* | 4/2018 | Saika .................. | H04N 5/2251 |
| 2018/0113462 A1* | 4/2018 | Fenn .................. | H04N 5/2253 |
| 2018/0115716 A1* | 4/2018 | Gubler ................ | B64D 47/08 |
| 2019/0074747 A1* | 3/2019 | Shukla ................ | F16M 11/18 |
| 2019/0132514 A1* | 5/2019 | Ibi ...................... | H04N 5/23267 |
| 2019/0179345 A1* | 6/2019 | McEwan ............. | G05D 1/0825 |
| 2019/0182424 A1* | 6/2019 | Omari ................. | H04N 5/23267 |
| 2020/0073393 A1* | 3/2020 | Berkenpas ........... | G01C 13/00 |

* cited by examiner

AUTOMATIC SURROUND PHOTOGRAPHING METHOD AND SYSTEM FOR TARGET

CROSS-REFERENCE TO RELATED APPLICATION

The present application is a Continuation Application of PCT Application No. PCT/CN2019/101267 filed on Aug. 19, 2019, which is based on Chinese patent application No. 201910713126.6 filed on Aug. 2, 2019, and claims its priority. The entire disclosure of the application is incorporated herein by reference in its entirety.

FIELD OF THE INVENTION

This disclosure relates to the field of artificial intelligence technology, and in particular to a method and system for automatically surrounding and photographing a target.

BACKGROUND OF THE INVENTION

With the popularization of smart devices, more and more consumers and users are using various smart electronic devices more and more frequently and intensively. Among the popular functions of the smart devices, photographing and video-recording are used most often by users.

In the prior art, when people create video materials with more agile targets and more flexible scene switching, the method used is nothing more than manual tracking photography, remote-controlled drone aerial photography, or tracking photography by a handheld camera plus a stabilizer. However, the tracking photography by the handheld camera plus the stabilizer requires the photographer to invest more efforts to follow a target and hold the camera steadily to track the target, and thus it is very laborious, and the remote-controlled drone aerial photography has the disadvantages of insufficient tracking strength, insufficient targeted video shooting function, and a short battery life. Moreover, these two tracking photography methods require two or more tracking photographers which do not conform to the original intention of fully intelligent automation.

SUMMARY OF THE INVENTION

Therefore, the objective of the present invention is to provide an automatic surround photographing method and system for a target, so as to achieve the purpose of surrounding and shooting a target automatically.

In a first aspect, an embodiment of this disclosure provides an automatic surround photographing method for a target, and the method includes: obtaining a yaw axis gimbal angle parameter, processing an image captured by a camera to obtain a distance parameter; calculating the steering gear rotation angle control parameter according to the yaw axis gimbal angle parameter and the distance parameters; controlling the rotation of the gimbal of the gimbal camera according to the yaw axis gimbal angle parameter so as to control a rotation of the camera, and controlling the rotation angle of the steering gear installed in a photographing-moving apparatus for placing the gimbal camera according to the steering gear rotation angle control parameter, so that the photographing-moving apparatus can surround, track and shoot the target.

In a second aspect, an embodiment of this disclosure further provides an automatic surround photographing system for a target, and the system includes a gimbal camera and a photographing-moving apparatus, and the gimbal camera has a gimbal, a camera, and a controller installed on the gimbal. The gimbal is provided for adjusting a rotation of the camera, and the photographing-moving apparatus is provided for placing the gimbal camera, and the photographing-moving apparatus has a steering gear installed on the photographing-moving apparatus for controlling the steering direction of the photographing-moving apparatus. The controller includes a first processing unit for obtaining a yaw axis gimbal angle parameter and processing an image captured by the camera to obtain a distance parameter; a second processing unit for obtaining a steering gear rotation angle control parameter according to the yaw axis gimbal angle parameter and the distance parameter; and a control adjusting unit comprising a gimbal control unit and a steering gear control unit, the gimbal control unit being provided for controlling the rotation of the gimbal of the gimbal camera according to the yaw axis gimbal angle parameter to control the rotation of the camera, and the steering gear control unit being provided for controlling the steering gear rotation angle of the photographing-moving apparatus according to the steering gear rotation angle control parameter, so that the photographing-moving apparatus can surround, track and shoot the target.

Compared with the prior art, this disclosure uses the photographing-moving apparatus to carry the gimbal camera which obtains the yaw axis gimbal angle parameter and processes the image captured by the camera to obtain the distance parameter, and calculates the steering gear rotation angle control parameter according to the yaw axis gimbal angle parameter and the distance parameter, and controls the rotation of the gimbal of the gimbal camera according to the yaw axis gimbal angle parameter control, so as to control the rotation of the control camera, and controls the rotation angle of the steering gear installed in the photographing-moving apparatus for placing the gimbal camera according to the steering gear rotation angle control parameter, so that the heading direction of the photographing-moving apparatus is always perpendicular to the connection line of the photographing-moving apparatus and the target while keeping the distance between the photographing-moving apparatus and target unchanged, so as to achieve surrounding, tracking and shooting the target. In this disclosure, the rotation direction and angle of the camera are adjusted to ensure the effects of tracking and shooting the target, and the rotation angle of the steering gear of the photographing-moving apparatus is adjusted to track and surround the moving target.

DESCRIPTION OF THE PREFERRED EMBODIMENTS

The technical contents of the present invention will become apparent with the detailed description of preferred embodiments accompanied with the illustration of related drawings as follows. It is intended that the embodiments and figures disclosed herein are to be considered illustrative rather than restrictive.

Figure 1:
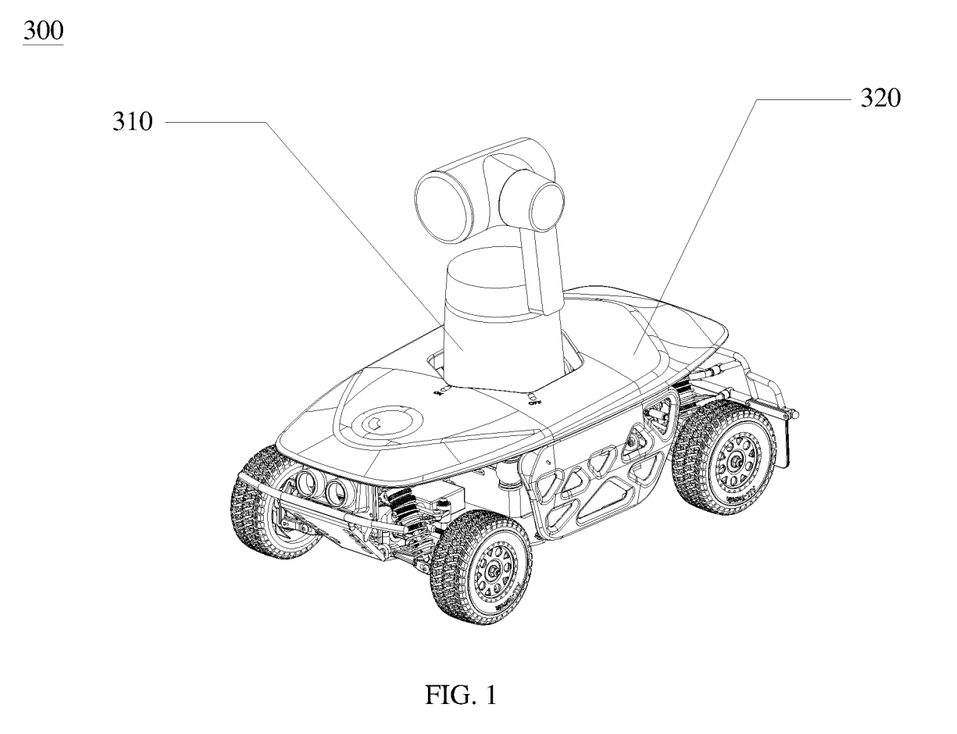
FIG. 1 is a perspective view of an automatic surround photographing system for a target in accordance with an embodiment of this disclosure.
Figure 2:
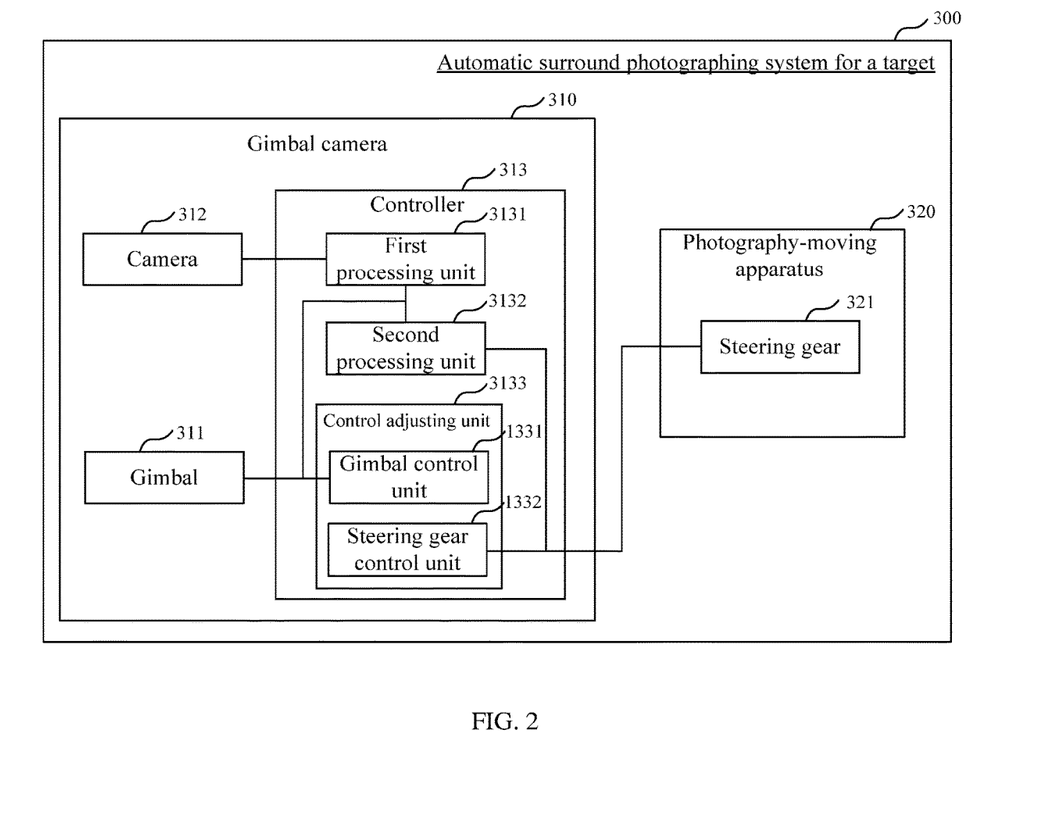
FIG. 2 is a schematic block diagram of an automatic surround photographing system for a target in accordance with an embodiment of this disclosure.

Referring to FIGS. 1 and 2 for the perspective view and schematic block diagram of an automatic surround target photographing system for a target 300 in accordance with an embodiment of this disclosure respectively, the automatic surround photographing system for a target 300 comprises a gimbal camera 310 and a photographing-moving apparatus 320, and the gimbal camera 310 comprises a gimbal 311, and a camera 312 and a controller 313 installed on the gimbal 311. In this disclosure, the camera 312 is mounted on the gimbal 311, and the camera 312 can be turned on to shoot an image or video of a target. The gimbal 311 is a conventional three-axis gimbal capable of driving the camera 312 to rotate in different directions and realize an all-round angle adjustment, and thus the gimbal 311 can rotate around the target. In this disclosure, the controller 313 is an ARM-M3/M4 cortex MCU, such as the STM32 series, GD32 series or a 32-bit microcontroller chip of any other platform. Preferably, the microcontroller chip with the model number GD32F330 is used as the controller 313 in this embodiment, and the controller 313 comprises a first processing unit 3131, a second processing unit 3132 and a control adjusting unit 3133, the first processing unit 3131, second processing unit 3132 and control adjusting unit 3133 are program modules executed by the microcontroller chip with the model number of GD32F330; the photographing-moving apparatus 320 is provided for accommodating the gimbal camera 310, and the photographing-moving apparatus 320 has a steering gear 321 for controlling the steering direction of the photographing-moving apparatus 320 and a motor for controlling the operating speed of the photographing-moving apparatus 320. In this embodiment, there is no dynamic control on the operating speed of the motor of the photographing-moving apparatus 320. In other words, the surround speed of the photographing-moving apparatus 320 is fixed. Understandably, the steering gear 321 is designed with a yaw axis (steering axis) angle control loop and a distance control loop for controlling the steering direction and the distance, and the yaw-axis angle control loop and distance control loop act on the steering of the steering gear 321 simultaneously. Preferably, the photographing-moving apparatus 320 of this embodiment is a robotic car, which has a shock absorber with suspension structure installed to a chassis of the robotic car, and a platform for placing the gimbal camera 310 is designed with a secondary shock absorption structure, and the motor is a two-speed brushless DC motor.

In this embodiment, the first processing unit 3131 is provided for obtaining a yaw axis gimbal angle parameter and processing an image captured by the camera 312 to obtain a distance parameter. The first processing unit 3131 directly obtains the yaw axis gimbal angle parameter based on the deep neural network and obtains the distance between the target and the camera 312 (which is the distance parameter) from the image based on the deep neural network, such technologies are technical means commonly used by those skilled in the art, and thus will not be repeated herein. The second processing unit 3132 is provided for calculating a steering gear rotation angle control parameter according to the yaw axis gimbal angle parameter and the distance parameter, and the control adjusting unit 3133 includes a gimbal control unit 1331 and a steering gear control unit 1332. The gimbal control unit 1331 is provided for controlling the rotation of the gimbal 311 of the gimbal camera 310 according to the yaw axis gimbal angle parameter to control the rotation of the control camera 312. The steering gear control unit 1332 is provided for controlling the rotation angle of the steering gear 321 of the photographing-moving apparatus 320 according to the steering gear rotation angle control parameter, so that the photographing-moving apparatus 320 can surround and track the target to shoot the target. Understandably, the gimbal control unit 1331 of the control adjusting unit 3133 transmits a control signal to the gimbal 311, and the steering gear control unit 1332 transmits a control signal to the steering gear 321, and both transmitted control signals are filtered and amplified to drive the gimbal 311 and the steering gear 321 to operate through driving circuits in the gimbal 311 and the steering gear 321. In this disclosure, the gimbal control unit 1331 of the control adjusting unit 3133 controls the yaw axis rotation of a three-axis gimbal of the gimbal camera 310 according to the yaw axis gimbal angle parameter to drive the rotation of the camera 312, and the steering gear control unit 1332 controls the rotation angle of the steering gear 321 of the robotic car according to the steering gear rotation angle control parameter, so that the heading direction of the photographing-moving apparatus 320 is always perpendicular to the connection line of the photographing-moving apparatus 320 and the target. In other words, the front of the robotic car always faces the tangential direction of the surround path, while the distance between the photographing-moving apparatus 320 and the target remains unchanged, so as to achieve the purposes of surrounding, tracking and shooting the target. In this disclosure, the automatic surround target photography system 300 can adjust the shooting angle of the camera 312, so that the lens of the camera 312 can face the target to ensure that the target always stays within the range of the lens, and the photographing-moving apparatus 320 can surround and follow the target while the target is moving.

Figure 3:
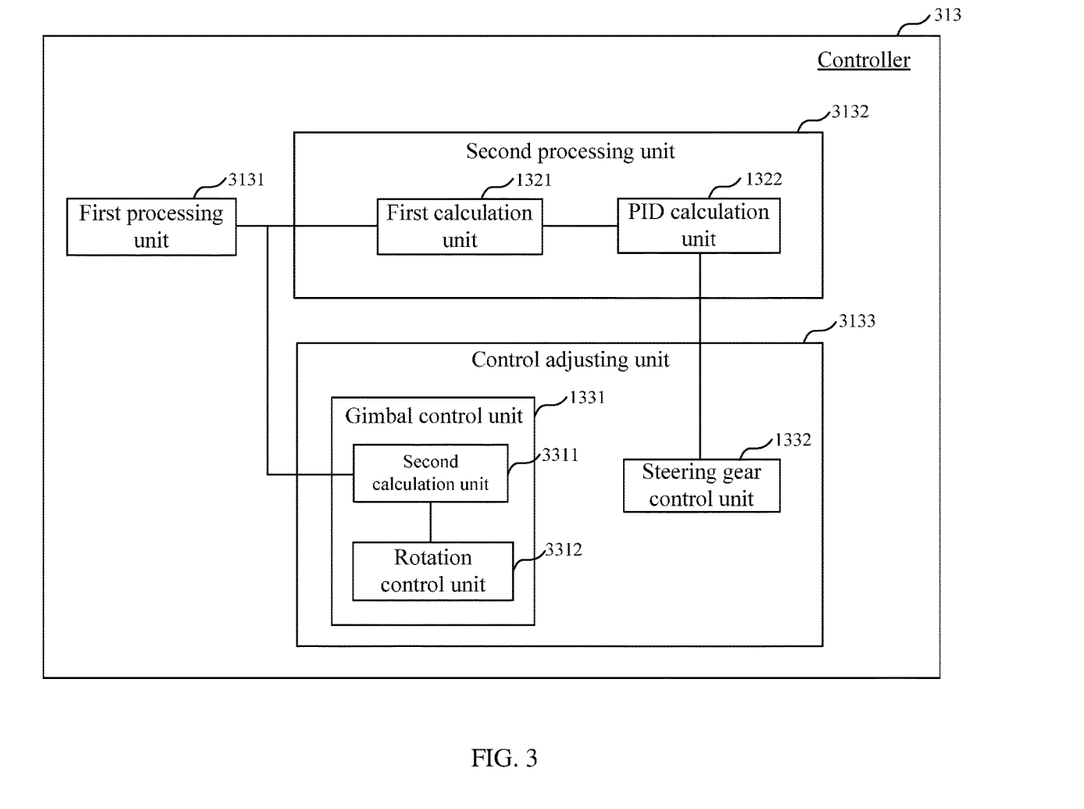
FIG. 3 is a schematic block diagram of a controller installed in an automatic surround photographing system for a target in accordance with an embodiment of this disclosure.

In another embodiment as shown in FIG. 3, the second processing unit 3132 includes a first calculation unit 1321 and a PID calculation unit 1322. The gimbal control unit 1331 includes a second calculation unit 3311 and a rotation control unit 3312.

Specifically, the first calculation unit 1321 is provided for calculating an angle deviation of the yaw axis gimbal angle parameter from the predetermined angle parameter and a distance deviation of the distance parameter from a predetermined radius. In this disclosure, when surrounding, tracking and shooting of a target is required, the camera 312 is configured to face the target to obtain a better shooting effect, and the yaw axis of the three-axis gimbal is rotated to 90° or −90° with respect to the forward direction of the car body. Further, the gimbal camera 310 and the photographing-moving apparatus 320 stay relatively still, so that the predetermined angle parameter is set to be 90° or −90° (corresponding to counterclockwise or clockwise motion respectively). In this embodiment, when the yaw axis gimbal angle parameter is negative, the predetermined angle parameter is 90°, and when the yaw-axis gimbal angle parameter is positive, the predetermined angle parameter is −90°. In this embodiment, the angle deviation of the yaw-axis gimbal angle parameter from the predetermined angle parameter is the difference between the actual sampling value (the angle of lens relative to the forward direction, which is the angle of the yaw axis of the three-axis gimbal relative to the forward direction) and the predetermined angle value; and the distance deviation is the difference between the actual distance value (the distance of the camera 312 relative to the target) and the predetermined radius. Preferably, the predetermined radius is set to be 1 m in order to obtain a better shooting effect. In other embodiments, the predetermined radius may be set according to actual needs. The PID calculation unit 1322 is provided for calculating a steering gear rotation angle control parameter according to the angle deviation and the distance deviation by the PID algorithm. Specifically, the PID calculation unit calculates the steering gear rotation angle parameter by the following PID algorithm:

$$u = a u_{yaw} + b u_1$$

$$u_{yaw} = K_{pyaw} \times \text{error}_{yaw} + K_{iyaw} \times \int \text{error}_{yaw} + K_{dyaw} \times d(\text{error}_{yaw})/dt$$

$$u_i = K_{p1} \times \text{error}_1 + K_{i1} \times \int \text{error}_1 + K_{d1} \times d(\text{error}_1)/dt$$

where, $K_{pyaw}$ and $K_{P1}$ are the coefficients of proportional terms of the angle deviation and the distance deviation respectively, $K_{iyaw}$ and $K_{i1}$ are the coefficients of integral terms of the angle deviation and the distance deviation respectively, $K_{dyaw}$ and $K_{d1}$ are the coefficients of differential terms of the angle deviation and the distance deviation, the values of the parameters $K_{iyaw}$, $K_{i1}$, $K_{dyaw}$ and $K_{d1}$ are 0, $\text{error}_{yaw}$ and $\text{error}_1$ are the angle deviation and the distance deviation respectively, $u_{yaw}$ and $u_1$ are the angle control parameter and the distance control parameter respectively, and a and b are the angle weight coefficient and the distance weight coefficient respectively.

Specifically, the second calculation unit 3311 is provided for calculating an angle deviation of the yaw axis gimbal angle parameter from the predetermined angle parameter; the rotation control unit 3312 is provided for controlling the rotation of the gimbal of the gimbal camera according to the angle deviation in order to control the rotation of the camera. In this disclosure, the angle of the camera 312 is adjusted, such that the lens of the camera 312 faces the target to ensure that the target always stays within the range of the lens.

In this embodiment, a: b is equal to 1:1. In other words, the relative weight ratio of the steering gear rotation angle control parameter to the distance parameter is controlled to be 1:1. When controlling the robotic car 321, the control loops of the yaw axis angle and the distance also affect the rotation angle of the steering gear 321, as the maximum and minimum rotation angles of the steering gear 321 of this disclosure are 40° and −40° respectively, and the control loops that limit the distance and the yaw axis angle both have a maximum and minimum PID outputs of 20° and −20° respectively. Understandably, the speed of the DC brushless motor is fixed without any dynamic control in the surround mode of this disclosure, and if the yaw axis rotation angle has a negative bias and the moving direction of the robot car keeps is unchanged, the robot car will always move in a direction away from the target; and if the yaw axis rotation angle has a positive bias and the moving direction of the robot car is unchanged, the robot car will always move in a direction towards the target. If the distance is greater than a reference surround radius (namely the predetermined radius), then the distance control loop has a cumulative effect relative to the yaw axis angle control loop, and if the distance is smaller than the reference surround radius, then the distance control loop has an offset effect relative to the yaw axis angle control loop.

In summation of the description above, the automatic surround photographing system for a target 300 in accordance with this disclosure adopts the robotic car to carry the gimbal camera 310. The yaw axis of the three-axis gimbal of the gimbal camera 310 rotates according to the yaw axis gimbal angle parameter, in order to drive the camera 312 to rotate so that the camera 312 faces the target to ensure the shooting effect. The steering direction of the steering gear 321 is controlled by using the PID algorithm, so that the heading direction of the photographing-moving apparatus 320 is always perpendicular to the connection line of the photographing-moving apparatus 320 and the target. In other words, the forward direction of the car body always has an angle of 90° or −90° relative to the yaw axis of three-axis gimbal, while the distance between the photographing-moving apparatus 320 and the target is unchanged, so as to maintain tracking and surrounding the target during the target is moving. The secondary shock absorption structure used by the robotic car may make the video shot more stable and allow the steering gear 321 to respond quickly without losing the target when the moving direction of the target suddenly changes.

Figure 4:
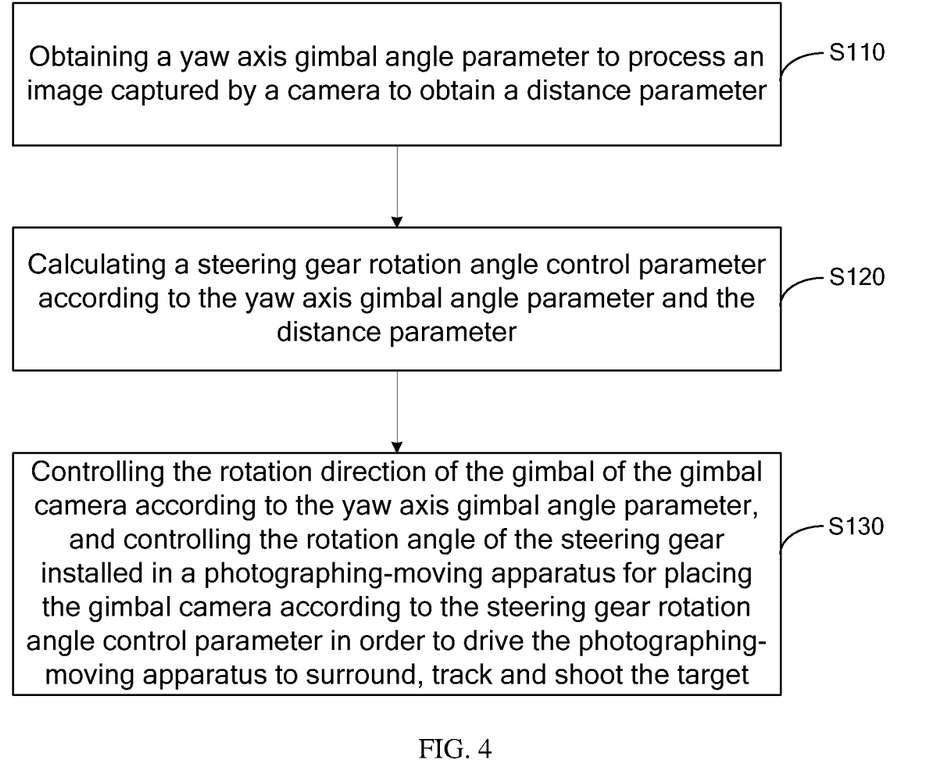
FIG. 4 is a flowchart of an automatic surround photographing method for a target in accordance with an embodiment of this disclosure.

Referring to FIG. 4 for a flow chart of an automatic surround photographing method for a target in accordance with an embodiment of this disclosure, the method includes the following steps S110-S130:

S110: Obtaining a yaw axis gimbal angle parameter to process an image captured by a camera to obtain a distance parameter In this disclosure, the yaw axis gimbal angle parameter can be obtained directly from an image based on a deep neural network, and the yaw axis gimbal angle parameter is used for controlling the rotation of the gimbal camera, so that the lens of the camera faces the target. Similarly, the image captured by the camera is processed based on the deep neural network to obtain the distance between the target and the camera, which is the distance parameter.

In this embodiment, the gimbal camera includes a gimbal and a camera installed to the gimbal, namely the camera is mounted on the gimbal, and the camera can be turned on to capture an image or record a video of the target. The gimbal of this disclosure adopts the conventional three-axis gimbal to drive the camera to rotate in different directions and realize an all-round angle adjustment and thus the gimbal can rotate around the target, and the camera is also a common camera and thus will not be described here. In this embodiment, the gimbal camera is placed on the photographing-moving apparatus, and the photographing-moving apparatus is a robotic car for driving the gimbal camera to track, follow and shoot the target, and the robotic car has a steering gear and a motor. In this disclosure, the operating speed of the motor is fixed without dynamic control.

S120: Calculating a steering gear rotation angle control parameter according to the yaw axis gimbal angle parameter and the distance parameter.

Figure 5:
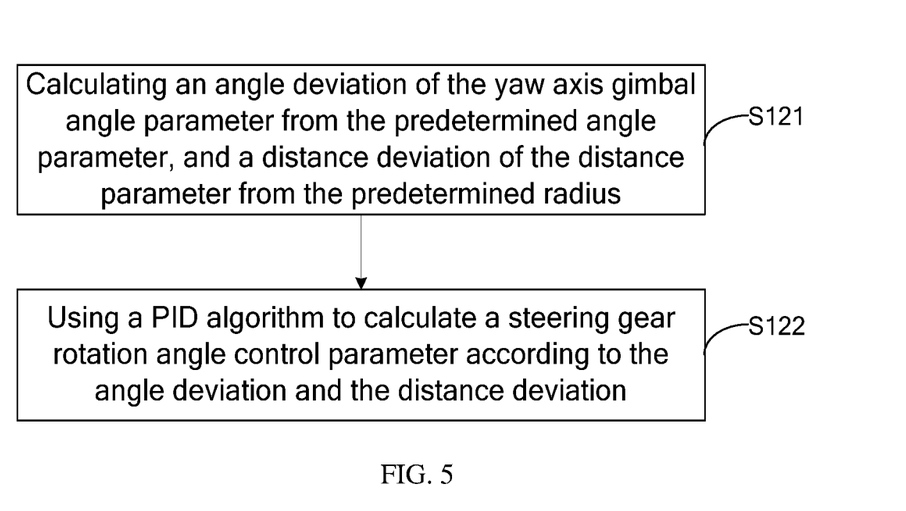
FIG. 5 is a flowchart showing a sub process of an automatic surround photographing system for a target in accordance with an embodiment of this disclosure.

Specifically, in some embodiments as shown in FIG. 5, the step S120 further includes steps S121-S122.

S121: Calculating an angle deviation of the yaw axis gimbal angle parameter from the predetermined angle parameter, and a distance deviation of the distance parameter from the predetermined radius.

In this disclosure, in order to obtain a better surround shooting effect, the camera is configured to face the target, and the yaw axis of the three-axis gimbal is rotated to 90° or −90° with respect to the forward direction of the car body. Further, the gimbal camera and the photographing-moving apparatus need to stay relatively still, so that the predetermined angle parameter is set to be 90° or −90° (corresponding to the counterclockwise or clockwise motion respectively). In this embodiment, when the yaw axis gimbal angle parameter is negative, the predetermined angle parameter is 90°, and when the yaw-axis gimbal angle parameter is positive, the predetermined angle parameter is −90°.

In this step, the angle deviation of the yaw-axis gimbal angle parameter from the predetermined angle parameter is the difference between the actual sampling value (the angle of lens relative to the forward direction, namely the angle of the yaw axis of the three-axis gimbal relative to the forward direction) and the predetermined angle; and the distance deviation is the difference between the actual distance value (the distance of the camera 312 relative to the target) and the predetermined radius. Preferably, the predetermined radius is set to be 1 m in order to obtain a better shooting effect. In other embodiments, the predetermined radius may be set according to actual needs.

S122: Using a PID algorithm to calculate a steering gear rotation angle control parameter according to the angle deviation and the distance deviation.

Specifically, the following PID (Proportional-Integral-Derivative control algorithm) algorithm is used for calculating the steering gear rotation angle parameter:

$$u = au_{yaw} + bu_1$$

$$u_{yaw} = K_{pyaw} \times \text{error}_{yaw} + K_{iyaw} \times \int \text{error}_{yaw} + K_{dyaw} \times d(\text{error}_{yaw})/dt$$

$$u_i = K_{p1} \times \text{error}_1 + K_{i1} \times \int \text{error}_1 + K_{d1} \times d(\text{error}_1)/dt$$

where, $K_{pyaw}$ and $K_{P1}$ are the coefficients of proportional terms of the angle deviation and the distance deviation respectively, $K_{iyaw}$ and $K_{i1}$ are the coefficients of integral terms of the angle deviation and the distance deviation respectively, $K_{dyaw}$ and $K_{d1}$ are the coefficients of differential terms of the angle deviation and the distance deviation respectively, $\text{error}_{yaw}$ and $\text{error}_1$ are the angle deviation and the distance deviation, $u_{yaw}$ and $u_1$ are the angle control parameter and the distance control parameter respectively, u is the steering gear rotation angle control parameter, which is the input control parameter for the control of the steering direction of the steering gear, and a and b are the angle weight coefficient and the distance weight coefficient respectively. In this embodiment, since the robot car needs to respond quickly, the parameters $K_{iyaw}$, $K_{i1}$, $K_{dyaw}$ and $K_{d1}$ have a value equal to 0 in order to avoid integration of tiny deviations over time. Preferably, a: b is set to be 1:1. In other words, the relative weight ratio of the steering gear rotation angle control parameter to the distance parameter is set to be 1:1.

S130: Controlling the rotation of the gimbal of the gimbal camera according to the yaw axis gimbal angle parameter, and control the rotation angle of the steering gear installed in the photographing-moving apparatus for placing the gimbal camera according to the steering gear rotation angle control parameter in order to drive the photographing-moving apparatus to surround, track and shoot the target.

Specifically, controlling the rotation of the gimbal of the gimbal camera according to the yaw axis gimbal angle parameter to drive and control the rotation of the camera further includes: calculating an angle deviation of the yaw axis gimbal angle parameter from the predetermined angle parameter, and controlling the rotation of the gimbal of the gimbal camera according to the angle deviation to control the rotation of the camera. In this disclosure, the shooting angle of the camera is adjusted according to the angle deviation, and the lens of the camera faces the target to ensure that the target always stays within the range of the lens.

Since the target may shift or move during the shooting process, the PID algorithm is used to simultaneously control the rotation angle of the steering gear of the photographing-moving apparatus according to the angle control parameter and the distance control parameter when the distance between the robotic car and the target changes, so as to control the path of the surrounding motion. The heading direction of the photographing-moving apparatus is always perpendicular to the connection line of the photographing-moving apparatus and the target, so that the front of the robotic car always faces the tangential direction of the surround path, while maintaining the distance between the photographing-moving apparatus and the target unchanged.

Understandably, in the control of the robotic car of this disclosure, both of the yaw axis angle control loop and the distance control loop affect the rotation angle of the steering gear, and the forward direction of the car body always has an angle of 90° or −90° relative to the yaw axis of the three-axis gimbal. In this disclosure, the speed of the DC brushless motor is fixed without dynamic control. If the yaw axis rotation angle has a negative bias and the robotic car keeps its moving direction unchanged, the robotic car will always move in a direction away from the target. If the yaw axis rotation angle has a positive bias, and the robotic car keeps its moving direction unchanged, the robotic car will move in a direction towards the target. If the distance is greater than a reference surround radius, namely the predetermined radius, then the distance control loop has a cumulative effect relative to the yaw axis angle control loop. If the distance is smaller than the reference surround radius, the distance control loop has an offset effect relative to the yaw axis angle control loop.

In summation, this disclosure uses the photographing-moving apparatus to carry the gimbal camera. The gimbal camera obtains the yaw axis gimbal angle parameter and processes the image captured by the camera to obtain the distance parameter, and calculates the steering gear rotation angle control parameter according to the yaw axis gimbal angle parameter and the distance parameter, and controls the rotation of the gimbal of the gimbal camera according to the yaw axis gimbal angle parameter control so as to control the rotation of the camera, and controls the rotation angle of the steering gear installed in the photographing-moving apparatus for placing the gimbal camera according to the steering gear rotation angle control parameter, so that the heading direction of the photographing-moving apparatus is always perpendicular to the connection line of the photographing-moving apparatus and the target while keeping the distance between the photographing-moving apparatus and target unchanged, so as to achieve the purposes of surrounding, tracking and shooting the target. In this disclosure, the rotation direction and angle of the camera are adjusted to ensure the photographing effect of the target, and the rotation angle of the steering gear of the photographing-moving apparatus is adjusted to track and surround the moving target.

It is noteworthy that the description of each of the aforementioned embodiments has its own emphasis, and for the parts that are not described in details in a certain embodiment, we can refer to the related descriptions of other embodiments. For simplicity the description of each embodiment is expressed as a series of action combinations, but those skilled in the art should be aware that this disclosure is not limited by the sequence of actions so described, because some steps can be performed in other sequences or at the same time according to this disclosure. Those skilled in the art should also be aware of the embodiment described in the specification is a preferred embodiment, and the actions and modules involved are not necessarily required by this disclosure. While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An automatic surround photographing method for a target, comprising the steps of:
   obtaining a yaw axis gimbal angle parameter to process an image captured by a camera to obtain a distance parameter;
   calculating a steering gear rotation angle control parameter according to the yaw axis gimbal angle parameter and the distance parameter; and
   controlling a rotation direction of a gimbal of a gimbal camera so as to control a rotation direction of the camera according to the yaw axis gimbal angle parameter, and controlling a rotation angle of the steering gear installed in a photographing-moving apparatus for placing the gimbal camera according to the steering gear rotation angle control parameter, in order to drive the photographing-moving apparatus to surround, track and shoot the target, so as to achieve shooting while surrounding the target,
   wherein calculating the steering gear rotation angle control parameter according to the yaw axis gimbal angle parameter and the distance parameter further comprises:
   calculating an angle deviation of the yaw axis gimbal angle parameter from a predetermined angle parameter, and a distance deviation of the distance parameter from a predetermined radius; and
   using a Proportional-Integral-Derivative (PID) algorithm to calculate the steering gear rotation angle control parameter according to the angle deviation and the distance deviation.

2. The automatic surround photographing method for a target according to claim 1, wherein using the PID algorithm to calculate the steering gear rotation angle control parameter according to the angle deviation and the distance deviation comprises using the PID algorithm to calculate the steering gear rotation angle control parameter:

$$u=au_{yaw}+bu_1$$

$$u_{yaw}=K_{pyaw}\times \text{error}_{yaw}+K_{iyaw}\times \int \text{error}_{yaw}+K_{dyaw}\times d(\text{error}_{yaw})/dt;$$

$$u_1=K_{p1}\times \text{error}_1+K_{i1}\times \int \text{error}_1+K_{d1}\times d(\text{error}_1)/dt;$$

wherein, values of parameters $K_{iyaw}$, $K_{i1}$, $K_{dyaw}$ and $K_{d1}$ are equal to 0, $K_{pyaw}$ and $K_{p1}$ are coefficients of proportional terms of the angle deviation and the distance deviation respectively, $\text{error}_{yaw}$ and $\text{error}_1$ are the angle deviation and the distance deviation respectively, a and b are an angle weight coefficient and a distance weight coefficient respectively, and $u_{yaw}$ and $u_1$ are the angle control parameter and the distance control parameter respectively.

3. The automatic surround photographing method for a target according to claim 1, wherein controlling the rotation direction of the gimbal of the gimbal camera so as to control the rotation direction of the camera according to the yaw axis gimbal angle parameter comprises:
   calculating an angle deviation of the yaw axis gimbal angle parameter from a predetermined angle parameter; and
   controlling the rotation direction of the gimbal of the gimbal camera according to the angle deviation so as to control the rotation direction of the camera.

4. An automatic surround photographing system for a target, comprising:
   a gimbal camera, having a gimbal, and a camera and a controller installed on the gimbal, the gimbal being used for adjusting a rotation direction of the camera; and
   a photographing-moving apparatus for placing a gimbal camera, the photographing-moving apparatus having a steering gear installed thereon for controlling a steering direction of the photographing-moving apparatus,
   wherein the controller includes:
   a first processing unit, for obtaining a yaw axis gimbal angle parameter, and processing an image captured by the camera to obtain a distance parameter;
   a second processing unit, for obtaining a steering gear rotation angle control parameter according to the yaw axis gimbal angle parameter and the distance parameter;
   a control adjusting unit, including a gimbal control unit and a steering gear control unit, the gimbal control unit being used for controlling a rotation of the gimbal of the gimbal camera according to the yaw axis gimbal angle parameter so as to control the rotation direction of the camera, and the steering gear control unit being used for controlling a rotation angle of the steering gear of the photographing-moving apparatus according to the steering gear rotation angle control parameter, so that the photographing-moving apparatus shoots the target while surrounding and tracking the target,
   wherein the second processing unit comprises:
   a first calculation unit, for calculating an angle deviation of the yaw axis gimbal angle parameter from a predetermined angle parameter and a distance deviation of the distance parameter from a predetermined radius;
   the predetermined angle parameter being 90° or −90°;
   a Proportional-Integral-Derivative (PID) calculation unit, for calculating a steering gear rotation angle control parameter according to the angle deviation and the distance deviation by a PID algorithm.

5. The automatic surround photographing system for a target according to claim 4, wherein the PID calculation unit calculates the steering gear rotation angle control parameter by the PID algorithm:

$$u=au_{yaw}+bu_1$$

$$u_{yaw}=K_{pyaw}\times \text{error}_{yaw}+K_{iyaw}\times \int \text{error}_{yaw}+K_{dyaw}\times d(\text{error}_{yaw})/dt;$$

$$u_1=K_{p1}\times \text{error}_1+K_{i1}\times \int \text{error}_1+K_{d1}\times d(\text{error}_1)/dt;$$

wherein, values of parameters $K_{iyaw}$, $K_{i1}$, $K_{dyaw}$ and $K_{d1}$ are equal to 0, $K_{pyaw}$ and $K_{p1}$ are coefficients of proportional terms of the angle deviation and the distance deviation respectively, $error_{yaw}$ and $error_l$; are the angle deviation and the distance deviation respectively, a and b are an angle weight coefficient and a distance weight coefficient respectively, and $u_{yaw}$ and $u_l$ are the angle control parameter and the distance control parameter respectively.

6. The automatic surround photographing system for a target according to claim 4, wherein the gimbal control unit comprises:
- a second calculation unit, for calculating an angle deviation of the yaw axis gimbal angle parameter from a predetermined angle parameter; and
- a rotation control unit, for controlling the rotation of the gimbal of the gimbal camera according to the angle deviation, so as to control the rotation direction of the camera.

* * * * *